N. CLUTE.
Harvester.
No. 17,555.
2 Sheets—Sheet 1.
Patented June 16, 1857.
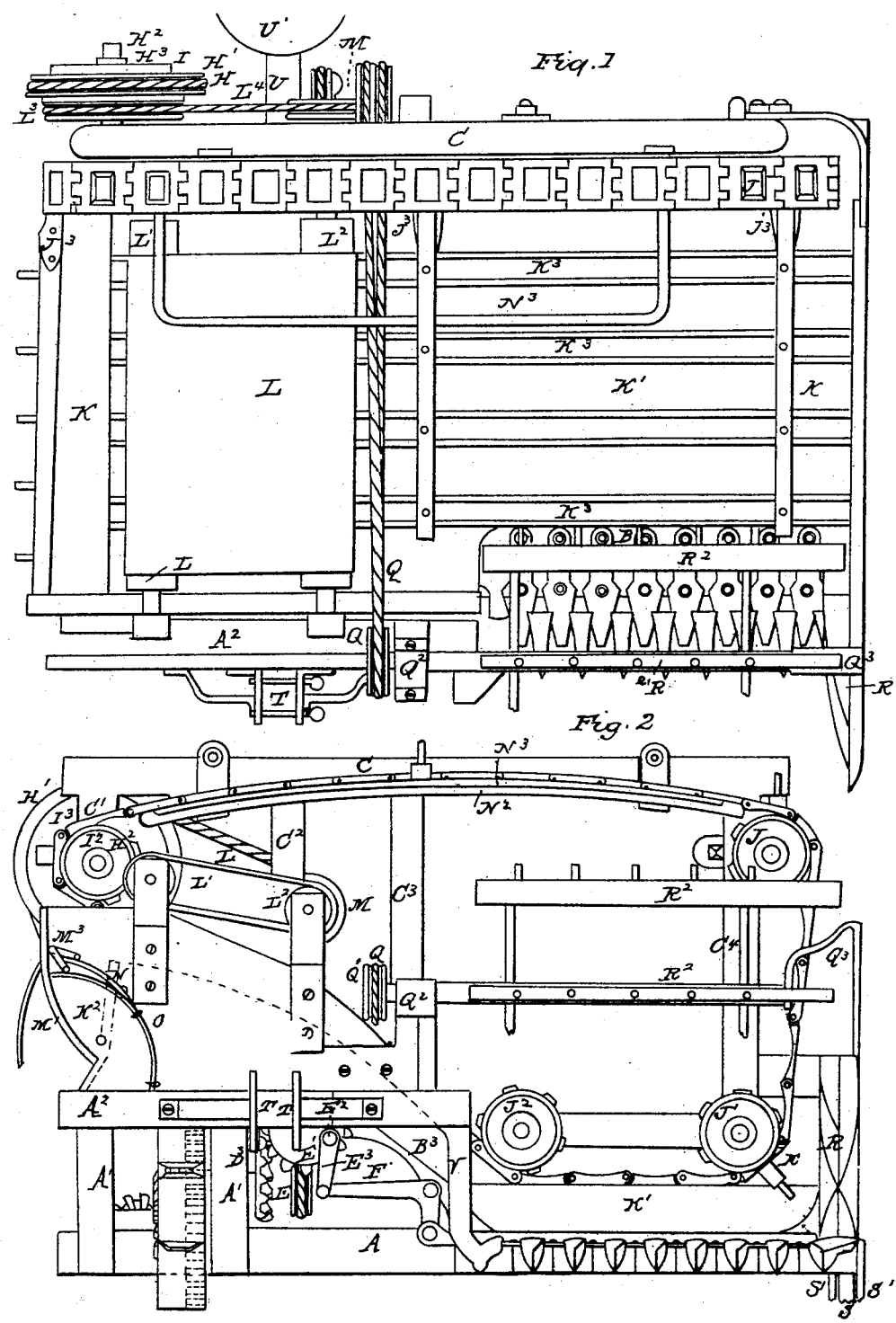

N. CLUTE.
Harvester.
No. 17,555.
2 Sheets—Sheet 2.
Patented June 16, 1857.
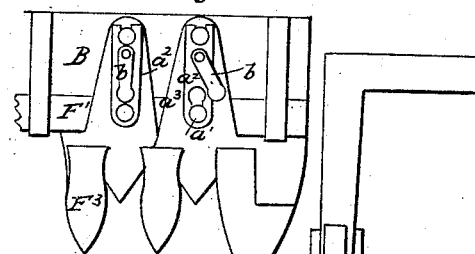
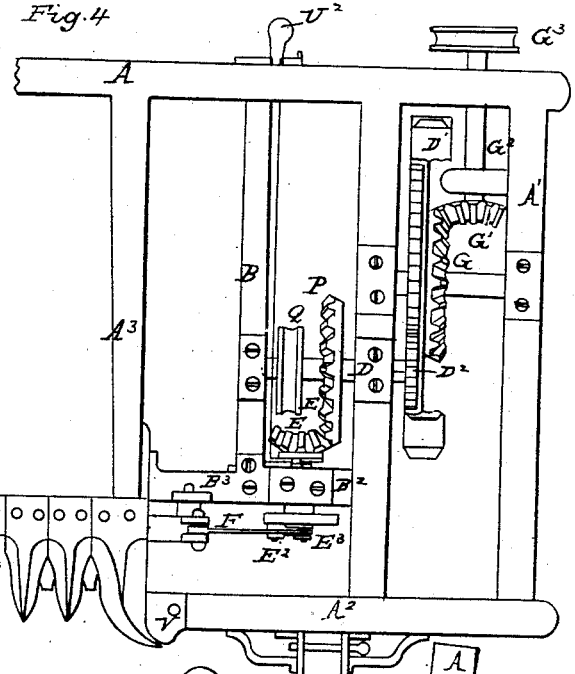
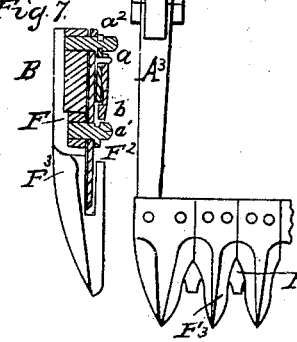
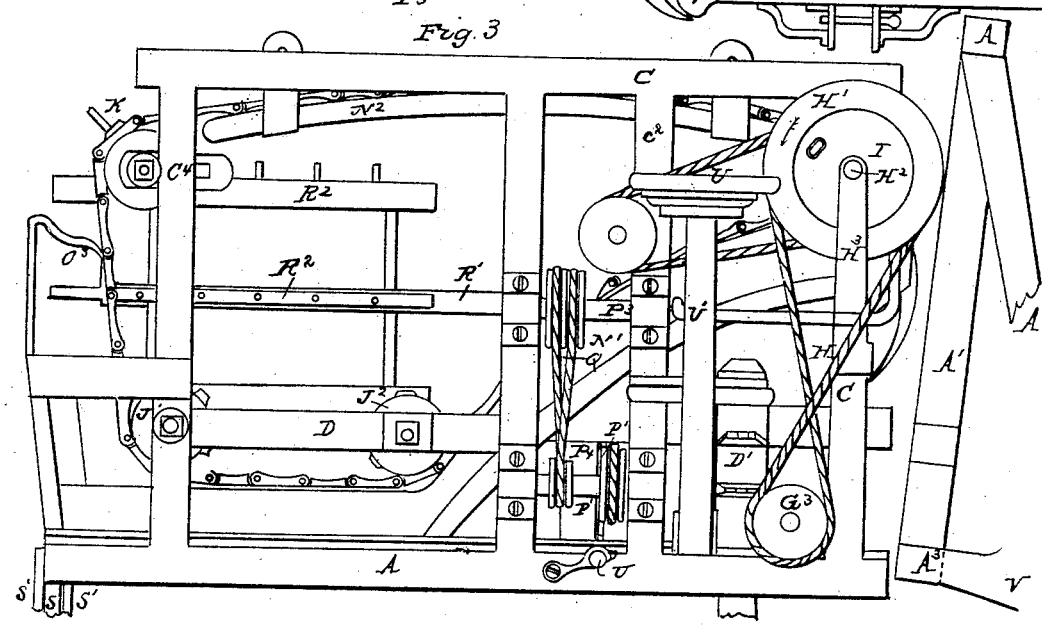

UNITED STATES PATENT OFFICE.

NICHOLAS CLUTE, OF DUNNSVILLE, NEW YORK.

IMPROVEMENT IN HARVESTERS.

Specification forming part of Letters Patent No. 17,555, dated June 16, 1857.

*To all whom it may concern:*

Be it known that I, NICHOLAS CLUTE, of Dunnsville, in the county of Albany and State of New York, have invented certain new and useful Improvements in Harvesting-Machines; and I do hereby declare that the same are described and represented in the following specifications and drawings.

To enable others skilled in the art to make and use my improvements, I will proceed to describe their construction and operation, referring to the drawings, in which the same letters indicate like parts in each of the figures.

Figure 1 is a plan of a machine for cutting grass and grain with my improvements. Fig. 2 is a front elevation of the same. Fig. 3 is an elevation of the rear of the machine. Fig. 4 is a plan of bottom of the bottom frame; Figs. 6 and 7, a plan and section of the cutting apparatus.

The nature of my invention and improvements in machines for harvesting grain, grass, and other crops consists in an apparatus to rake the grain from the platform, consisting of an endless belt carrying projecting arms provided with teeth which rake the grain, and in combination therewith the arrangement of an endless apron to remove the crop cut from the backs of the arms or heads of the rakes.

In the accompanying drawings, A is the back bar of the frame, which is connected by the cross-bars A' A' to the front bar, A². The back bar, A, is also connected by the cross-bars A³ A³, which incline downward to the finger-bar B, as shown in the drawings. There is a middle cross-bar, B', fastened in the back bar, A, and connected to the bar A' by the bar B², and to the bar A³ by the curved brace B³, as shown in the drawings, Fig. 4.

The top bar, C, is supported by four standard, C' C² C³ C⁴, from the back bar, A, the standards C³ and C⁴ being connected by the bar D, which completes the main frame of the machine, to which the other parts are either fastened or connected.

The shaft of the main wheel D' turns in the bars A'. The interior of the periphery of this wheel is provided with teeth, which act on the pinion D². (Shown in dotted lines in Fig. 2.) This pinion is fastened to the shaft D³, which turns in the bars A' and B' and carries the bevel-gear E to drive the pinion E' and turn the crank-shaft and crank E², which is connected by the link E³ to the bell-crank F, which works on a stud in the brace B³, being connected to the sickle-bar F', so as to operate it and vibrate the sickle-teeth F², which vibrate in the guard-fingers F³, fastened to the bar B, the rear ends of the sickle-teeth being fastened to said bar B, as shown in Figs. 6 and 7, where the finger and sickle bars, with the parts attached, are shown enlarged. In these figures the studs $a\ a$ are fastened in the finger-bar B, and the studs $a'\ a'$ are fastened in the sickle-bar F' and the sickle-teeth F², are made in the form shown, with two holes in them, to fit onto the studs in the finger and sickle bars, which studs are provided with scores just above the teeth F², for the bars or slides $a^2\ a^2$. These slides are made in the form shown in the drawings—that is, with a score in one end to slip onto the score in the stud $a$, and a hole, $a^3$, at the other end to let the end of the stud $a'$ through it, with a narrow score from the hole $a^3$ to slip onto the score in the stud $a'$ to lock the teeth onto the studs; and to lock the slides onto the studs they are provided with springs $b\ b$, with a knob to fit the hole $a^3$, as shown in Fig. 7, to lock the slides onto the studs, preventing them from slipping forward; but when the slides are to be removed to take off the teeth to sharpen them the springs $b$ permit the knobs to be raised out of the holes $a^3$ and moved one side, as shown in Fig. 6, so that the slide may be slipped forward and taken off and release the sickle-teeth.

The bevel-gear G is fastened to the wheel D' and turns the pinion G' and shaft G², which turns in boxes fastened to the bars A and A', (see Fig. 4,) and turns the pulley G³, which carries the band H to turn the pulley H' and shaft H², which shaft turns in the standard C', and stand H³, fastened to said standard.

The disk I is fastened to the shaft H², and has a hole in it for the spring-catch I', fastened to the pulley H', so arranged that when the pulley is turned in the direction indicated by the arrow the disk and shaft are turned by the pulley; but if the pulley is turned in the opposite direction, by backing the machine the catch slips around under the disk, which, with the shaft, remains stationary. The sprocket-wheel I² is fastened to the shaft H² and carries the endless belt I³, made in the form shown in the drawings, of open links of metal hinged together, so as to yield or bend readily in passing around the sprocket-wheels J and J′, which turn on studs fastened to the standard C⁴, and the wheel J², which turns on a stud in the bar D.

Several of the links in the belt I³ are provided with projections J³ J³, between which the arms or heads of the rakes K K are fastened, so as to be carried by the belt, and rake the crop, cut by the sickle, from the platform K′, on which it falls, up over the inclined or raised part of the platform K′, so that it will fall into the gavel-box K². (Shown by broken lines in Fig. 2.)

To make the teeth of the rake take all the grain or crop from the platform, I make some ridges, K³, to hold the straw up a little, with a space between them for the points of the rake-teeth, as shown in the drawings.

To clear the straw from the backs of the rake-heads as they pass over the curved inclined part of the platform, I arrange an endless apron, L, upon the rollers L′ and L², which rollers have shafts turning in proper boxes and supports shown in the drawings. The pulley L³, fastened to the pulley H′, carries a band, L⁴, to the pulley M on the shaft of the roller L², so as to turn it and move the apron L faster than the heads of the rakes, to carry any loose straggling straw that hangs or lies across the rake-heads forward, so as to clear the heads and let the grain fall free and clear into the gavel-box K². The outside M′ of this box is curved, as shown in Fig. 2, and fastened to a rod, which is bent, on the rear of the machine, as shown in Fig. 3 at M², so that the driver can depress it with his foot when there is sufficient grain in it to form a sheaf, and let it fall out onto the ground. The other end of the rod which operates the side M′ is bent, as shown in Fig. 2 at M³, and is acted upon by the spring N to close the side M′ after the grain has fallen out, and hold it, too, until it is opened again.

The arch N′ is fastened to the standards C² and C³ to guide the belt and keep it parallel to the curved part of the platform, and the arch N² is fastened to the bar C by brackets to support the belt I³ between the wheels I² and J, and the bent rod N³ is fastened in the arch N² to sustain the rakes K K as they pass across the top of the machine.

The pulley P, Fig. 4, is fastened to the shaft D³, and carries a band to turn the pulley P′ on the shaft P², which shaft turns in boxes fastened to the standards C² and C³, and the shaft P³, right above it, is arranged in a similar manner. The pulley P⁴ is fastened to the shaft P² and carries the band Q, which runs over two pulleys on the shaft P³, (one of them turns loose,) which guide it to and from the pulley Q′ on the reel-shaft, which turns in stands Q² and Q³, the former fastened to the front casing and the latter to the divider R, as shown in the drawings, and the reel-shaft R′ does not extend so far as the rails R² of the reel at the opposite end from the pulley, and the stand Q³ is bent over and extends within the ends of the rails R², as shown in the drawings. This arrangement prevents the straw from being caught by the reel-shaft and getting tangled, as it would do if the stand was straight and the shaft extended beyond the rails of the reel. The axle of the wheel S, Fig. 4, which supports the side of the machine next to the standing crop, turns in brackets S′ S′, fastened to the bar A³.

The brackets T T are fastened to the front bar, A², and are perforated for a pin on which the tongue vibrates, and by which it is drawn. These brackets are also provided with a series of holes for a pin to hold the tongue in the required position, either high or low.

There are some brackets fastened to the bars A and A′ for the end of the bar U, which supports the driver's seat U′, Fig. 1.

The pinion E′ is fitted to turn loose on the crank-shaft, and is locked to it by a common clutch fitted to the shaft and traversed to release or lock the pinion to the shaft by a rod from the knob U², Fig. 3, so as to stop the sickle when moving the machine from one field to another. The curved metal brace V connects the front bar, A², to the finger-bar B and holds each bar in its proper relative position.

The sickle-teeth can be removed and replaced with the greatest facility by a common laborer, either for sharpening or to supply their places with others.

I believe I have described and represented my improvements so as to enable any person skilled in the art to make and use them. I will now state what I desire to secure by Letters Patent, to wit:

I claim—

The raking apparatus described, consisting of the endless belt I³, carrying arms or rakes K K, when used in combination with the endless clearing-apron L, and curved and elevated platform K′, all arranged to operate in the manner and for the purposes herein set forth.

NICHOLAS CLUTE.

Witnesses:
JAMES R. STEERS,
PETER A. SHARP.